3,037,870
COMPOSITIONS AND METHODS FOR PROCESSING MEAT PRODUCTS

Hans Schleich, Staten Island, N.Y., and Robert S. Arnold, Chicago, Ill., assignors to Baxter Laboratories, Inc., Morton Grove, Ill., a corporation of Delaware
No Drawing. Filed Sept. 8, 1960, Ser. No. 54,594
24 Claims. (Cl. 99—222)

This application is a continuation in part of the U.S. patent application, Serial Number 802,027, filed March 26, 1959, now abandoned.

This invention relates to the production of cured animal products. More particularly, this invention relates to novel products and processes for the enzymatic curing of meat products.

Since hams and other cured meat products frequently have an undesirable fibrous and stringy texture, there have been a number of attempts to process these products in the presence of proteolytic enzymes. Such enzymes, through proteolysis, render the products considerably less fibrous and stringy. Those enzymes which have been used most extensively for this purpose are bromelin, frequently used in the form of fresh pineapple juice, papain and other proteases derived from suitable plant sources. The principal reason for treating hams and other pickled and smoked cured products with enzymes has been to increase their palatability and tenderness. However, the use of these enzymes has not been completely satisfactory. Because the enzymes are not easily inactivated during the processing of the meat, over-tenderization frequently occurs. The consequent lack of uniformity in tenderization has materially retarded the commercial development of enzymatic processes for tenderizing hams and other cured meat products. As a result, the bulk of the commercially tenderized pork products are currently being processed in the absence of enzymes by smoking the products or by cooking them until a high internal temperature is realized. These processes, however, are disadvantageous in that substantial shrinkage and weight losses occur. Such weight losses are often as great as 8% or more over the inital green weight of a ham, i.e., ham weight prior to processing.

An object of this invention is to provide improved products and processes for tenderizing hams, shoulders, picnics and other meat products. A further object is to provide enzymatic products which, when employed in the processing of meat products, are excellent tenderizers and which are, moreover, readily inactivated once the tenderization of the meat has been accomplished. Another object is to provide for the processing of hams a tenderizing process which will not cause undesirable shrinkage and weight losses.

In accordance with this invention, compositions effect meat tenderization without the danger of overtenderizing. The meat tenderizers of this invention comprise a bacterial protease and a sodium higher phosphate. This sodium higher phosphate may be sodium tripolyphosphate, a sodium pyrophosphate, sodium hexametaphosphate or sodium tetraphosphate.

The bacterial protease when employed in conjunction with the sodium higher phosphate and when pumped, i.e., introduced, into hams and other meat products, effects a desirable tenderization of such products without the risk of overtenderization and the consequent irreparable damage to the products. One source of this bacterial protease is an organism which, according to the classification system outlined in Aerobic Sporeforming Bacterial, U.S. Department of Agriculture, Agricultural Monograph No. 16, belongs to the genus and species, *Bacillus subtilis*.

Meats processed according to this invention need not be submerged in the pickling solution after pumping. There is, therefore, a substantial reduction in handling time in the plant, and the excessive use of pickling solution is avoided. Hams processed according to this invention, moreover, may be processed in the conventional manner to an internal temperature of as low as about 143° F. Temperatures substantially lower than 143° F. are not entirely safe because of the possibility that parasites present in the meat will survive the processing. Hams processed to temperatures on the order of 143° F. are completely safe for human consumption, and they do not show the weight losses and shrinkage generally encountered when hams are processed to conventional internal temperatures of the order of 154° F. The net effect of this process is to produce at 143° F. tenderized hams which are more uniformly tender than hams processed by the conventional methods at 154° F., or even higher temperatures.

In the practise of this invention as it relates to the processing of hams, shoulder, butts, and analagous products, the bacterial protease is mixed with a pickling solution containing at least one sodium higher phosphate. The sodium higher phosphate may be sodium tripolyphosphate, the sodium pyrophosphates, including the sodium acid pyrophosphates, sodium hexametaphosphate or sodium tetraphosphate. A pickling solution which may be a conventional pickling solution for curing and which also contains a proteolytic enzyme derived from *Bacillus subtilis* and such an akali metal higher phosphate can be incorporated into a meat product to produce a weight gain of 10 to 12%. Meats which are stitch pumped, i.e., random introduction of pickle into the meat by pumping, or pumped through the arterial system may be then placed in mesh bags, and hung on racks at room temperature (60–70° F.) for a period of 8 to 12 hours. One of the advantages of the process of this invention is that the bacterial protease appears to cause a more rapid distribution of the pickle solution in the meat itself, eliminating the necessity for submersing the meat in the pickling solution. The meat is then either smoked in the conventional manner in the smokehouse for 10–14 hours, is baked, or is cooked in hot water or steam. Hams thus processed do not tend to shrink to less than their initial weight and are comparable in tenderness with similar hams processed without enzyme added to an internal temperature of at least 154° F.

*Bacillus subtilis* produces protease on substantially any medium containing the nutrients which the organism requires for good growth. Adequate amounts of bacterial protease are produced by *Bacillus subtilis* in an aqueous medium of the following compositions:

| | Percent by weight |
|---|---|
| Starch hydrolysate | 6.0 |
| Casein hydrolysate | 1.0 |
| $Na_2HPO_4$ | 0.5 |
| Yeast extract | 0.5 |
| Ferric ammonium citrate | 0.03 |
| $MgSO_4 \cdot 7H_2O$ | 0.03 |
| Water | 91.94 |

The pH of this medium prior to sterilization is 7.0–7.2. After sterilization for 35 minutes at 26 lbs. steam pressure, the pH will be from 5.9–6.1.

Papain, bromelin, a protease derived from *Aspergillus oryzae*, and ficin, when added to the pickling solution used in pumping hams are not inactivated to any considerable degree by these higher phosphates, and such enzymes are not within the scope of this invention.

A typical pumping pickling solution may be described as follows:

| Material: | Parts by weight |
|---|---|
| Sodium tripolyphosphate | 2.8 |
| Sodium chloride | 10.7 |
| Sucrose | 2.8 |
| Dextrose | 8.5 |
| Sodium nitrite | 0.2 |
| Sodium nitrate | 0.6 |
| Sodium isoascorbate | 0.04 |
| Protease from *B. subtilis*. | |
| Water | 74.16 |

The quantity of bacterial protease used in the practise of this invention depends upon the nature of the phosphate used in the pickling solution. When the pickle solution is pumped into the meat, it is preferred to use a pickling solution that contains a quantity of protease equivalent to a protease value as hereinafter defined of approximately 0.13 unit per gram, although in certain instances it is desirable to use materials with a protease value as low as 0.01 and as high as 0.70 unit per gram. On the other hand, where pieces of meat are immersed in the pickle solution, it is preferred to use a pickling solution that contains a protease value of approximately 1.50 protease units per gram, although in certain instances it is desirable to use materials with a protease value as low as 0.5 and as high as 2.5 protease units per gram. The expression, protease value units, is employed herein to designate the proteolytic activity of an enzyme preparation. For purposes of definition, 1.66 protease value units per gram represents that degree of enzymatic activity which in one hour at 37° C. is effective to lower by a factor of 50% the initial viscosity of 250 grams of a 14% gelatin solution of pH 8.0–8.4.

The effect of various phosphates on the rate of inactivation of *Bacillus subtilis* protease at 5° C. and at the end of a three hour period is shown in the following table:

| Type of Phosphate: | Percent inactivation |
|---|---|
| Sodium tripolyphosphate | 66 |
| Disodium phosphate | 6 |
| Sodium pyrophosphate | 29 |
| Sodium hexametaphosphate | 22 |
| Sodium tetraphosphate | 52 |

It will be apparent from the results expressed above that with the exception of orthophosphate, i.e., disodium phosphate, all of these phosphates effected substantial enzyme inactivation. In accordance with this invention, any one or more of the higher phosphates—sodium tripolyphosphate, sodium pyrophosphate, sodium hexametaphosphate and sodium tetraphosphate are employed in pickling solutions with protease in an amount within the described range for the tenderizing of meat. The total amount of higher phosphate or phosphates used is 2 to 5%, and preferably 2.5 to 3.5% by weight of the pickling solution.

In the following examples, a commercial *Bacillus subtilis* protease, was used to process the meats. A culture of the strain of the *Bacillus subtilis* employed for the production of this protease is deposited in the American type culture collection under the designation ATCC 6051a. The following typical examples are intended only to describe this invention with particularity and are not to be considered as limiting the invention in any of its useful applications.

*Example I*

A 21-pound trimmed weight ham was pumped through the arterial system to a 15% weight gain with the pumping pickling solution described above. The concentration of the tenderizer in this solution was 0.25 protease value units. After pumping, the hams were boned, put into stainless steel molds and cooked for six hours to an internal temperature of 152° F. Meat so processed was very tender when compared with a similar size ham processed in the same way in the absence of bacterial protease. The flavor of the enzyme treated meat was milder, and was judged by experienced processors of ham to be decidedly superior to that of the control ham which was not processed with enzymes.

*Example II*

A ham which weighed 10¾ pounds after trimming was stitch pumped with a pickling solution equivalent to the one described above to a weight of 12½ pounds. Immediately after pumping, in order to retain the pickling solution, the ham was placed in a plastic bag which was permeable to smoke and was then placed in a net bag for smoking. In this test the protease value of the pickling solution was adjusted to 0.10 unit. The ham was held at room temperature for 12 hours and was then smoked for 13 hours to an internal temperature of 143° F. After smoking, this ham showed a net gain in weight over the green weight of the ham of 2.3% whereas the control, pumped under similar conditions without enzyme, showed no weight gain. Upon slicing, there was no indication of wetness on the surface of either of the hams. Slices of both the enzyme processed and control ham were compared in eating tests. It was noted that the tenderized ham cooked more uniformly and had a better color and a better texture.

A ham was processed according to the process described in Example II, with a proteolytically equivalent amount of papain substituted for the bacterial protease employed in Example II. An equal amount by weight of sodium ascorbate was substituted for the sodium isoascorbate. The ham was processed in the same manner as the ham in Example II. When the ham was removed from the smokehouse there was no apparent evidence of overtenderization. However, upon storage, tenderization proceeded to the extent that at the end of ten days the ham was completely unfit for human consumption. The action of the papain enzyme was, therefore, not effectively stopped at an internal temperature of 143° F. in the presence of sodium tripolyphosphate.

*Example III*

A ham was pumped using a pickling solution similar to that described in Example I except that the sodium isoascorbate was eliminated. The level of protease in the pickling solution added to the ham was equivalent to 0.50 unit. The ham under investigation was pumped to a 12% weight gain over the green weight of the ham and the comparable control ham from the same hog was also pumped to a 12% weight gain with the same pickling solution without added sodium isoascorbate and without added enzyme. Smoking time on these hams was equivalent to the smoking times described in Example II, and the final results of the tenderization tests were similar to those encountered in Example II. Weight determinations of the finished hams indicated that a 5% gain in weight was noted with the ham processed with enzyme whereas with respect to the ham processed without enzyme, there was a 1% loss as compared with the green weight.

*Example IV*

A 10½ pound ham was pumped through the arterial system with a pickling solution analogous to that of Example I, but which contained no phosphate, contained an equivalent amount by weight of sodium ascorbate substituted for the sodium isoascorbate, and contained a quantity of protease equivalent to a protease value of 0.15 unit. Processing of this ham was equivalent to the process described in Example II. At the end of the process the ham was tender. Upon storage, however, this ham continued to deteriorate and within two weeks was discernably overtenderized. The ham at the end of two weeks was pressed and the juice thus obtained was analyzed for protease content. Protease was detected in this expressed juice.

Example V

Pieces of fresh pork shoulder were cut into cubes approximately one inch in size. These cubes were immersed in a pickling solution equivalent to the solution described in Example II, to which had been added the equivalent of 1.50 units of the protease derived from *Bacillus subtilis*. The meat was stored in this solution at 38° F. for a period of 12 hours. The pieces of pork were then removed from the solution, mixed with seasoning and stuffed into casings. The meat was then smoked to an internal temperature of 145° F. and was then cooked in water to an internal temperature of 165° F. The resultant sausage product had a finer texture and flavor than the product processed in a parallel control experiment wherein no bacterial protease was added to the pickle.

The cooking time of the hams processed with enzyme according to this invention and specified in the examples appears to be shorter than that required for cooking the untenderized controls. Furthermore, the tenderized hams were considerably more palatable and tasty than the controlled untenderized hams processed at the same time.

What is claimed is:

1. The process of preparing tenderized meat products at a temperature of at least 143° F. which comprises contacting meat with an aqueous solution containing a bacterial protease and 2 to 5% by weight of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.01 to 2.5 protease value units per gram of solution, 1.66 protease unit values per gram being the degree of enzymatic activity which in one hour at 37° C. is effective to lower by a factor of 50% the initial viscosity of 250 grams of a 14% gelatin solution of pH 8.0–8.4.

2. The process of preparing tenderized meat products at a temperature of at least 143° F. which comprises immersing meat in an aqueous solution containing a bacterial protease and 2 to 5% by weight of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.5 to 1.5 protease value units per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

3. The process of preparing tenderized meat products at a temperature of at least 143° F. which comprises immersing meat in an aqueous solution containing a bacterial protease and 2.5 to 3.5% by weight of a sodium higher phosphate selected from the class consisting of sodium hexametaphosphate, sodium pyrophosphate, sodium acid pyrophosphate, sodium tetraphosphate and sodium tripolyphosphate, the quantity of said bacterial protease being within the range of 0.5 to 1.5 protease value units per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

4. The process of preparing tenderized meat products at a temperature of at least 143° F. which comprises contacting meat with an aqueous solution containnig a bacterial protease and 2 to 5% by weight of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.1 to 0.70 protease value unit per gram of solution, 1.66 protease units per gram being the degree of enzymatic activity which in one hour at 37° C. is effective to lower by a factor of 50% the initial viscosity of 250 grams of a 14% gelatin solution of pH 8.0–8.4.

5. The process of preparing tenderized meat products at a temperature of at least 143° F. which comprises contacting meat with an aqueous solution containing a bacterial protease and 2.5 to 3.5% by weight of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.01 to 0.70 protease value unit per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

6. The process of preparing tenderized meat products in accordance with claim 4, in which the bacterial protease is derived from *Bacillus subtilis*.

7. The process of producing tenderized meat in accordance with claim 4, in which the meat is ham.

8. The process of preparing tenderized meat products in accordance with claim 4, in which the higher phosphate is sodium hexametaphosphate.

9. The process of preparing tenderized meat products in accordance with claim 4, in which the higher phosphate is sodium pyrophosphate.

10. The process of preparing tenderized meat products in accordance with claim 4, in which the higher phosphate is sodium acid pyrophosphate.

11. The process of preparing tenderized meat products in accordance with claim 4, in which the higher phosphate is sodium tetraphosphate.

12. The process of preparing tenderized meat products in accordance with claim 4, in which the higher phosphate is sodium tripolyphosphate.

13. In the process of preparing tenderized meat products which are processed to an internal temperature of at least 143° F., the step of incorporating into the structure of such meat products a bacterial protease and a pickling solution which contains 2.5 to 3.5% by weight of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.01 to 0.70 protease value unit per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

14. In the process of preparing tenderized meat products, the steps of incorporating into the structure of such products a bacterial protease derived from *Bacillus subtilis* and a pickling solution which contains 2.5 to 3.5% by weight of a sodium higher phosphate selected from the group consisting of sodium hexametaphosphate, sodium pyrophosphate, sodium acid pyrophosphate, sodium tetraphosphate and sodium tripolyphosphate and raising the internal temperature of the meat product to at least 143° F., the quantity of said bacterial protease being about 0.13 protease value unit per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

15. A pickling solution for use in the preparation of meat products by processing at a temperature of at least 143° F. comprising a bacterial protease and 2 to 5% by weight of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.1 to 2.5 protease value units per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

16. A pickling solution for use in the preparation of meat products by processing at a temperature of at least 143° F. comprising a bacterial protease and 2.5 to 3.5% by weight of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.1 to 2.5 protease value units per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

17. A pickling solution for use in the preparation of meat products by processing at a temperature of at least 143° F. comprising a bacterial protease and 2 to 5% of a sodium higher phosphate selected from the groups consisting of sodium hexametaphosphate, sodium pyrophosphate, sodium acid pyrophosphate, sodium tetraphosphate and sodium tripolyphosphate, the quantity of said bacterial protease being within the range of 0.1 to 0.70 protease value units per gram of solution, 1.66 protease value units per gram being the degree of enzymatic activity which in one hour at 37° C. is effective to lower by a factor of 50% the initial viscosity of 250 grams of a 14% gelatin solution of pH 8.0–8.4.

18. A pickling solution for use in the preparation of meat products by processing at a temperature of at least 143° F. comprising a bacterial protease and a 2.5 to 3.5% of a sodium higher phosphate selected from the group consisting of sodium hexametaphosphate, sodium pyrophosphate, sodium acid pyrophosphate, sodium tetraphosphate and sodium tripolyphosphate, the quantity of said bacterial protease being within the range of 0.01 to 0.70 protease value unit per gram of solution, 1.66 protease value units per gram being the degree of enzymatic activity which in one hour at 37° C. is effective to lower by a factor of 50% the initial viscosity of 250 grams of a 14% gelatin solution of pH 8.8–8.4.

19. The pickling solution of claim 17 in which the meat product is ham and the bacterial protease is derived from *Bacillus subtilis*.

20. The pickling solution of claim 17 in which the higher phosphate is hexametaphosphate.

21. The pickling solution of claim 17 in which the higher phosphate is pyrophosphate.

22. The pickling solution of claim 17 in which the higher phosphate is acid pyrophosphate.

23. The pickling solution of claim 17 in which the higher phosphate is tripolyphosphate.

24. The pickling solution of claim 17 in which the higher phosphate is tetraphosphate.

References Cited in the file of this patent
UNITED STATES PATENTS

| | | |
|---|---|---|
| 2,221,689 | Jensen | Nov. 12, 1940 |
| 2,903,366 | Barnett | Sept. 8, 1959 |
| 2,904,442 | Underkofler | Sept. 15, 1959 |

OTHER REFERENCES

"Chemicals And The Meat Industry," Circular No. 14, June 1955, by H. R. Kraybill, published by American Meat Institute Foundation, 939 East 57th St., Chicago, Ill., page 5, article entitled Curing Ingredients.